United States Patent [19]
Carlson et al.

[11] Patent Number: 4,876,545
[45] Date of Patent: Oct. 24, 1989

[54] ADAPTIVE BLANKING INTERFACE APPARATUS FOR SELF-PROTECTION JAMMING EQUIPMENT EMPLOYED IN CONJUNCTION WITH RADAR SYSTEMS

[75] Inventors: Christopher M. Carlson, Denville; Nicholas Deninno, Mahwah, both of N.J.

[73] Assignee: ITT Corporation, New York, N.Y.

[21] Appl. No.: 137,854

[22] Filed: Dec. 24, 1987

[51] Int. Cl.$^4$ ............................................. H04K 3/00
[52] U.S. Cl. ..................................... 342/14; 342/15
[58] Field of Search .................................. 342/13–19

[56] References Cited

U.S. PATENT DOCUMENTS

| | | |
|---|---|---|
| H513 | 8/1988 | Dunne et al. ............... 342/14 X |
| 3,772,702 | 11/1973 | Nielsen . |
| 3,870,995 | 3/1975 | Nielson . |
| 3,895,385 | 7/1975 | Alpers . |
| 3,896,438 | 7/1975 | Schrader, Jr. . |
| 3,905,035 | 9/1975 | Krumboltz et al. . |
| 3,916,408 | 10/1975 | Evans et al. . |
| 3,947,848 | 3/1976 | Carnahan et al. . |
| 3,953,851 | 4/1976 | Weidstam . |
| 3,956,729 | 5/1976 | Epstein et al. . |
| 4,025,920 | 5/1977 | Reitbeeck et al. . |
| 4,092,645 | 5/1978 | Proud . |
| 4,097,865 | 6/1978 | Jones . |
| 4,217,580 | 8/1980 | Lowenschuss . |
| 4,342,119 | 7/1982 | Seidl . |
| 4,429,311 | 1/1984 | Barewald . |
| 4,454,513 | 6/1984 | Russell . |
| 4,700,191 | 10/1987 | Manor ............................ 342/13 |

Primary Examiner—Thomas H. Tarcza
Assistant Examiner—John B. Sotomayor
Attorney, Agent, or Firm—Thomas N. Twomey; Mary C. Werner

[57] ABSTRACT

There is disclosed an interface apparatus which enables a radar jamming system to operate in conjunction with a number of different radar warning receivers. The interface enables the jamming apparatus to couple to various types of radar warning receivers and to specify proper blanking intervals for each of the receivers according to the type of blanking required and the operation of such receivers. The system employs a look-through blanking bus which essentially consists of six data lines and a strobe. The data on this bus is fully encoded to provide 64 individual command codes. The command codes are established by the particular RWR and are made available via the interface to the jamming system over a multiplexed bus. This bus operates to initially specify the RWR by determining the various codes which are transmitted by the RWR. For each code transmitted there is an identification number which defines frequency ranges while providing a field to determine the real time action to be taken upon receipt of the code which is transmitted over the look-through blanking bus. In this manner by determining the type of data received on the look-through bus the jamming apparatus can determine which type of RWR it is connected to and therefore determine what blanking information is necessary in order to accommodate proper system operation.

18 Claims, 7 Drawing Sheets

JAMMING ASSIGNMENT MESSAGE DESCRIPTION

RETRANSMIT REQUEST MESSAGE FORMAT DESCRIPTION

ADAPTIVE BLANKING INTERFACE APPARATUS FOR SELF-PROTECTION JAMMING EQUIPMENT EMPLOYED IN CONJUNCTION WITH RADAR SYSTEMS

The government has rights in this invention under a government contract No. N00019-81-C-0369 awarded by the Naval Air Systems Command.

BACKGROUND OF THE INVENTION

This invention relates to jamming equipment in general and more particularly to an adaptive blanking interface which will enable a radar jamming system to interface with a plurality of different radar warning receivers.

As is well known, radars jammers are employed to transmit microwave energy and can do so with the object of confusing or obscuring information that other radars are attempting to gather. The concept as indicated is referred to as jamming and jamming is of two fundamental types. A first type of jamming approach is referred to as a brute force approach while a second type of jamming equipment employs a deceptive routine. Brute force jamming attempts to obscure as completely as possible the information contained in other radar signals by overpowering these signals. On the other hand, deceptive jamming endeavors to create mutations in the information contained in other radar signals to render them less useful tactedly. Both types of jammings are aided by the one-way transmission characteristic as contrasted with the two-way transmission characteristic of active radar.

This feature allows a deceptive jammer to operate successfully with a few watts of transmitted power against for example a radar transmitting hundreds of thousands of watts of peak power. In any event, the design of jamming radar systems is a very difficult and sophisticated technique and is a considerable problem in regard to radar systems in general. The difficulties arise from the vast multitude of possibilities with which a jamming system must cope.

In modern military aircraft self-protection equipment which are normally found in the installation are a radar warning receiver (RWR) and a radar jammer. The RWR is capable of detecting the presence of radar threats and provides a display of the type, proximity and location of such threats. The radar jammer provides radar deception techniques to deny the capability to perform target tracking and weapon systems delivery from radar controlled weapon systems. In any event, the combination of the radar jammer and the radar warning receiver has been employed extensively in modern military aircrafts as well as in other locations.

As one can ascertain, there are many different companies which supply different radar warning receivers. As such, each of the receivers require different blanking schemes in order to assure operation and compatibility with the associated radar jammer. In regard to radar jamming devices certain devices have been designated as aircraft self-protection jammers (ASPJ). Such devices exist on various military aircraft and, as will be described subsequently, operate to provide jamming signals to enemy radar installations in order to confuse such systems and in order to circumvent the firing of missiles and various other devices which are capable of destroying the aircraft.

As one will ascertain, currently designed RWR/jammer interface equipment as well as other avionic jamming equipment do not adapt themselves easily to the changing of blanking frequency ranges or cannot accommodate different types of blanking without substantial changes to hardware involved with the jamming equipment or the RWR or both. It is understood that hardware changes to current military avionics are involved efforts requiring extensive time and funding This further is complicated by the fact that packaging or the placement of additional hardware in an aircraft is an extremely difficult task to implement.

As one would readily ascertain, the space available on an aircraft is extremely limited and the addition of additional hardware or circuitry oftentimes is an impossible task.

Thus, the above-noted constraints limits the use of jamming equipment to a small number of platforms thus creating a complexity in the different types of jamming equipment which may be employed. While the invention is described in regard to an aircraft self-protection jammer (ASPJ), the general technique is applicable to any device which employs a transmitter which will be used in multiple configurations and which radar transmitter or other transmitter must be blanked by other equipment during the course of operation. Other devices and apparatus which fall into the general category of this invention are jamming equipment, radars and altimeters.

It is a general object of the present invention to develop a system of accommodating the blanking needs of a variety of different radar warning receivers (RWR). A combination of software processing and unique hardware elements is employed to adapt the jamming equipment to the blanking scheme of the RWR of its host aircraft. The apparatus to be described enables one to utilize various RWR's with different ASPJ devices and eliminates the necessity of reprogramming or adjustment of an ASPJ device.

Hence, such devices can be moved from one aircraft type to another and, based on the hardware to be described, can successfully interface with different RWR types or configurations. Thus, the apparatus to be described eliminates the requirements for hardware modification of the jammer and enables a jammer to interface with different RWR devices.

BRIEF DESCRIPTION OF THE PREFERRED EMBODIMENT

In an electronic countermeasures (ECM) system of the type employing a jamming apparatus including a transmitter portion for transmitting jamming signals in order to deceive a foreign transmitter/receiving apparatus and including a warning receiver means operative to receive foreign or threat transmissions to determine the nature of such transmissions and to inform said jamming apparatus of the nature of such threat transmissions, with said warning receiver means capable of operating according to different modes in order to determine the nature of said foreign transmissions, the combination therewith of apparatus for providing selective blanking to said jamming apparatus according to the modes of operation of said receiver means to allow said receiver means and said jamming means to operate without interference between the same, comprising interface means coupled between said jamming apparatus and said receiver means and adapted to exchange information between said jamming apparatus and said receiver means to generate optimum blanking parameter information between said jamming apparatus and said receiver means according to the mode of operation of said receiver means whereby any one of said modes can be accommodated by said ECM system according to said information exchanged.

DETAILED DESCRIPTION OF THE FIGURES

Figure 1:
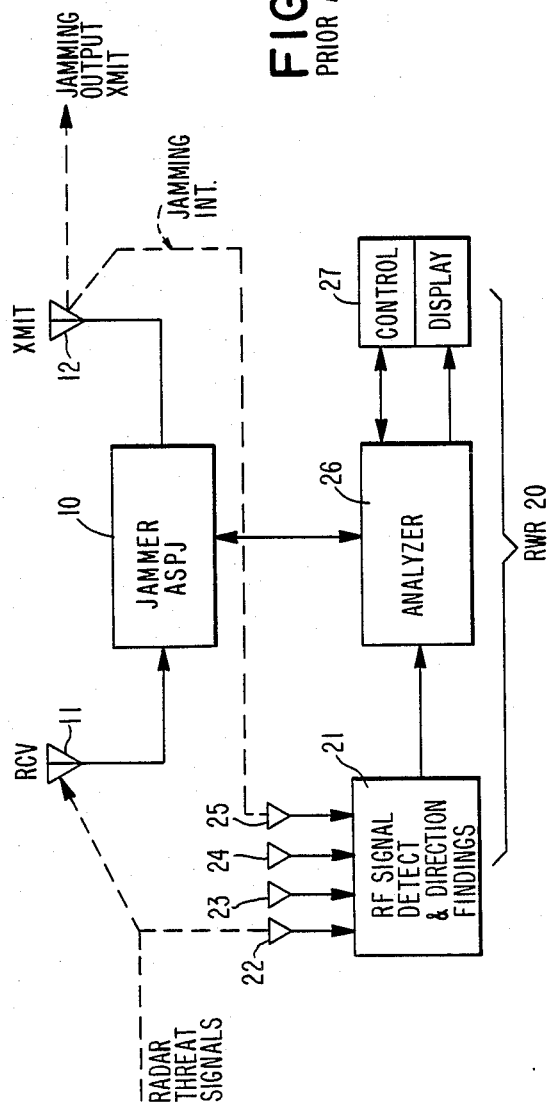
FIG. 1 is a simple block diagram showing a conventional jamming apparatus operating in conjunction with a RWR or radar warning receiver.

Referring to FIG. 1, there is shown a simple block diagram of a jammer which operates in conjunction with an RWR.

The jammer 10 is indicated as an ASPJ which stands for aircraft self-protection jammer. The RWR or radar warning receiver operates in conjunction with the jammer 10. As seen from FIG. 1, in modern military aircraft selfprotection equipment is normally found in the installation suite and includes the radar warning receiver RWR 20 and the radar jammer 10. The RWR is capable of detecting the presence of radar threats and provides a display of the type, proximity and location of such threats. The radar jammer 10 provides radar deception techniques to deny the capability to perform target tracking and weapon delivery from radar controlled weapon systems.

As seen in FIG. 1, the RWR 20 includes a front end stage 21. The stage 21 essentially is a receiver device which is capable of responding to RF signals which are received by four antennas designated as 22-25. Each antenna as 22-25 is operative to cover a quadrant of space whereby the four antennas cover a full 360°. The antenna array is coupled to the RF signal detection and direction finding module 21. Essentially, the module 21 is well known and operates in conjunction with the analyzer 26. The RWR uses the received signals as received by antenna pairs and from the signal strength is able to determine the angle of arrival of each signal designated in FIG. 1 as radar threat signals.

Such threat signals are separated from friendly signals by analysis of the threat parameters such as the radio frequency, the pulse partition rate, pulse width and other modulation characteristics of specific and known threat systems. This determination is performed by the analyzer 26 which interfaces with the control and display functions 27 located in the aircraft cockpit. The control and display functions provide a suitable display to the pilot of the aircraft in order for him to determine the nature of the threat. The analyzer 26 is a minicomputer which includes memory and data buses and is programmed to analyze and interpret received signals. In any event, the jammer 10 receives signal inputs from the receive antenna 11 associated therewith and also performs signal analysis complimented with data inputs from the associated RWR. For those signals identified as threats jamming transmissions are generated according to prestored programs which are included in the jammer 10 via an internal processor.

In any event, as one can ascertain, the jammer 10 is associated with a transmit antenna 12 which antenna 12 will transmit jamming output signals. As is seen in FIG. 1, the output of the jamming antenna 12 provides jamming signals which signals are also coupled to the antenna array 22-25 associated with the RWR 20. Thus, the output of the jammer 10 provides signals which can couple into the RWR receive antennas 22-25 either via leakage paths or by direct transmission. Thus, the RWR as well as the ASPJ 10 must interface via a blanking scheme. The blanking scheme is required to insure that the jamming output signals are not erroneously identified as radar threat signals by the RWR. Hence, as one can ascertain, a special interface is required between the RWR 20 and the jammer or ASPJ 10. This enables the units to establish a blanking schedule to the jammer which allows the RWR 20 to gather sufficient threat identification data and at the same time does not degrade the quality of the jamming output via the transmitting antenna 12. As indicated above, the interface between ASPJ and the various RWR's are different in regard to different systems. Hence, each RWR is in fact hard wired to the ASPJ and the ASPJ cannot operate with a different RWR without extensive hardware modifications.

In regard to present military aircraft such aircraft may utilize different RWR's such as for example a specific RWR for a Navy installation as compared to a different RWR for an Air Force installation.

Figure 2:
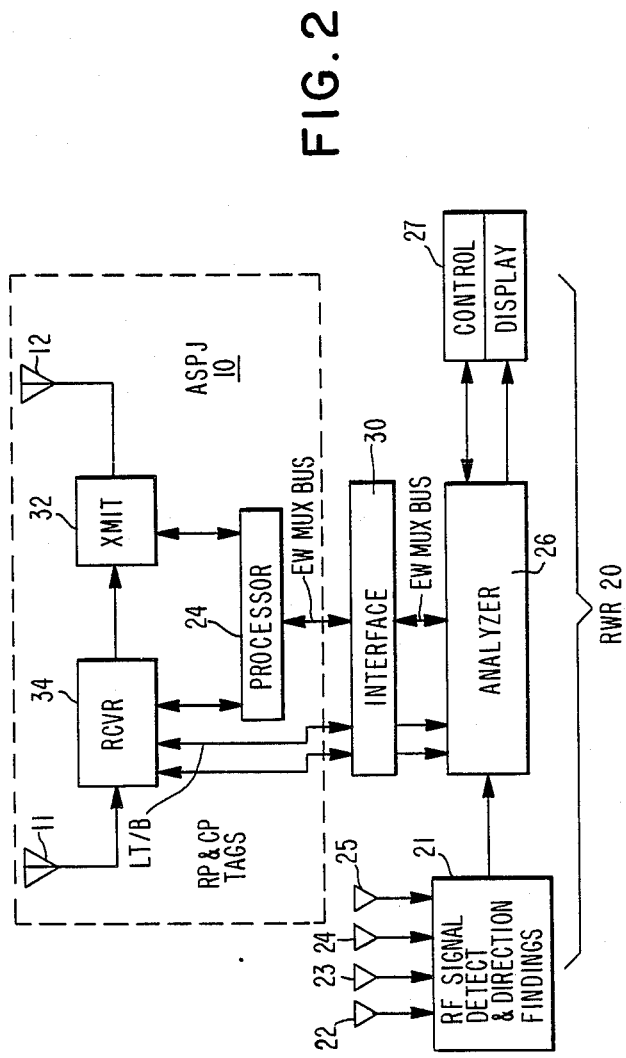
FIG. 2 is a detailed block diagram showing a system according to this invention whereby a jamming system interfaces with an RWR via an interface according to this invention.

Referring to FIG. 2, there is shown a more detailed block diagram indicating an interface 30 which is positioned between the RWR 20 and the ASPJ or jamming unit 10. As can be seen from FIG. 2, similar reference numerals have been retained to describe similar operating parts as shown in FIG. 1. As seen from FIG. 2, the RWR 20 includes the antenna array including antenna elements 22-25 which are coupled to module 21 which performs RF signal detection and direction findings.

The RWR 20 includes the analyzer 26 and the control and display module 27. The ASPJ 10 or jammer is shown in greater detail. As one can ascertain from FIG. 2, the ASPJ 10 includes a receiving portion 31 for receiving threat signals and a transmitting portion 32 which is coupled to antenna 12 for transmitting jamming signals. Both the receiver 31 and the transmitter 32 are coupled to a processor 24 which processor performs the above-noted analysis and also contains suitable programs for generating different jamming formats according to the type of threat detected by the system.

As indicated above, located between the processor 24 of the ASPJ 10 and the analyzer 26 of the RWR 20 is an interface module designated as module 30. The function of module 30 as will be explained is to operate as an interface between the ASPJ and different RWR's to enable the different RWR's to interface with the ASPJ unit and to provide the proper blanking parameters between the two systems. As seen in FIG. 2, there is an EW MUX bus which essentially is a serial data bus and is used to exchange threat information between the two modules and to set up the blanking mechanism parameters between the ASPJ 10 and the RWR 20.

There is also a bus designated as the LT/B bus which is a look-through/blanking bus. This bus provides high speed coded blanking commands from the RWR 20. There are also a further bus designated as TAGS. These interfaces carries TAG information which is generated in the ASPJ 10 in conjunction with the blanking commands and operates to blank the RWR 20 in real time. Hence, as one will understand in reference to FIG. 2, the interface 30 enables one to operate without reprogramming or adjusting the ASPJ 10 which based on the interface can operate with different RWR's enabling one ASPJ to be moved from one aircraft to another and to provide a successful interface with each different RWR. As should be clear from FIG. 2, the interface 30 includes the EW MUX bus, the look-through/blanking bus and two real time tag lines designated as RP and CP. The term RP stands for repeater pulse while the term CP stands for cover pulse as will be explained.

The EW MUX bus is an interface which is utilized to exchange messages between RWR 20 and the ASPJ 10. The lookthrough/blanking (LT/B) bus issues real time commands for blanking jammer outputs and for the generation of the tag outputs. The RP and CP tags provide real time video corresponding to ECM transmitted pulses and received threat signals respectively. It is, of course, understood that ECM stands for electronic counter measures and designates the type of transmission desired.

Figure 3:
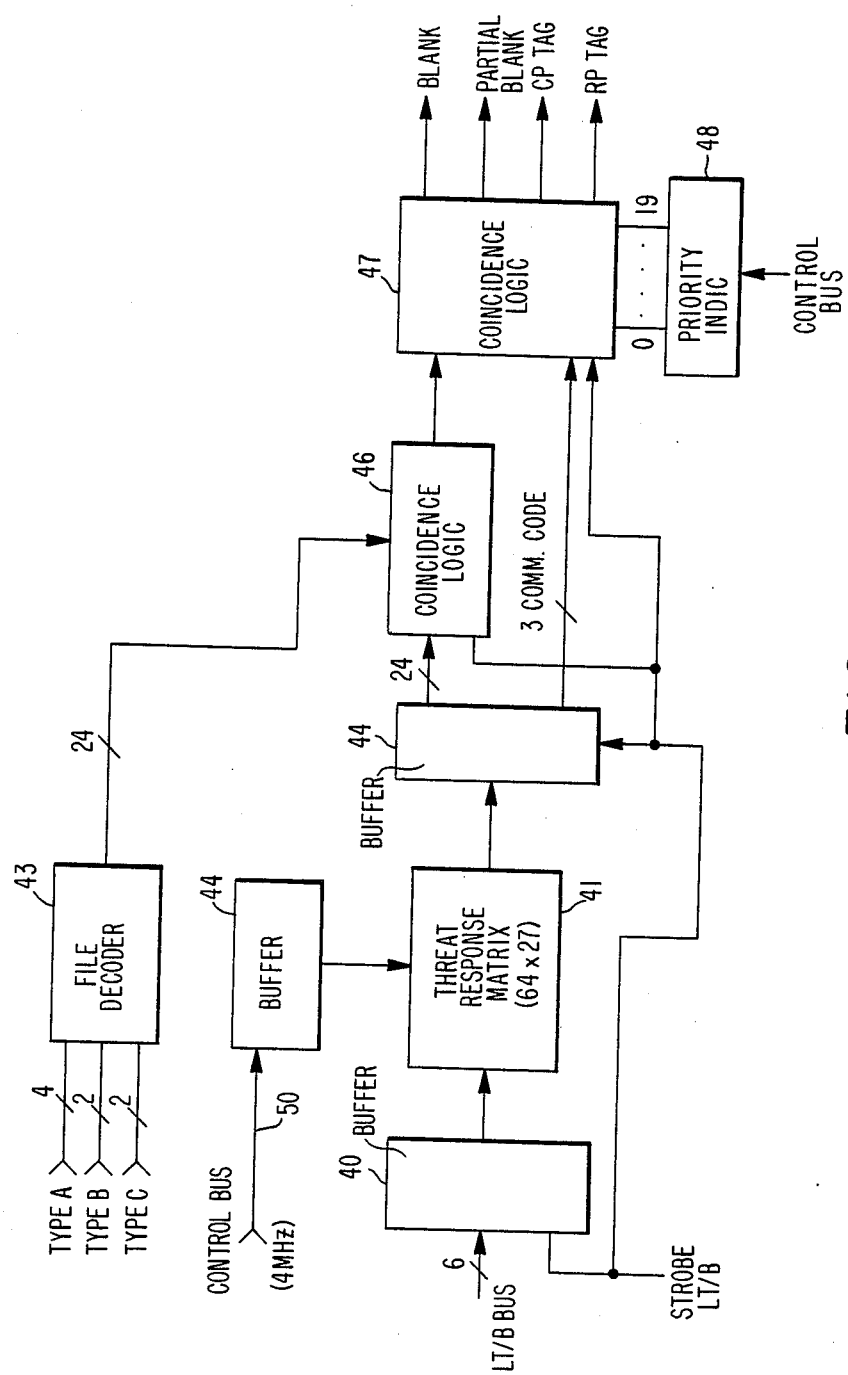
FIG. 3 is a detailed block diagram showing the interface between the RWR and jammer as for example depicted in FIG. 2.

Referring to FIG. 3, there is shown a more detailed block diagram of the particular interface discussed. As one can see, the LT/B bus is inputted to a buffer 40. The LT/B bus consists of six data lines and a strobe. The data on this bus is fully encoded to provide 64 individual command codes. The data emanating from the LT/B bus is stored in buffer 40 as indicated above.

As will be explained, the definition of the codes which are carried by the LT/B bus is established by the RWR and is made available to the ASPJ over the EW MUX bus during system initialization. This data is contained and stored in the processor 24 of the ASPJ and is generated and transmitted by the analyzer 26 of the RWR. Both devices are well known in the art. The definition of these codes is given in the look-through code assignment messages which for example are shown in detail in regard to FIG. 7. As one can see from FIG. 7 for each code in the look-through code assignment, there is an identification number which enables the messages to define a frequency range and provide a field which defines the real time action to be taken upon receipt of code number over the LT/B bus.

Figure 7:
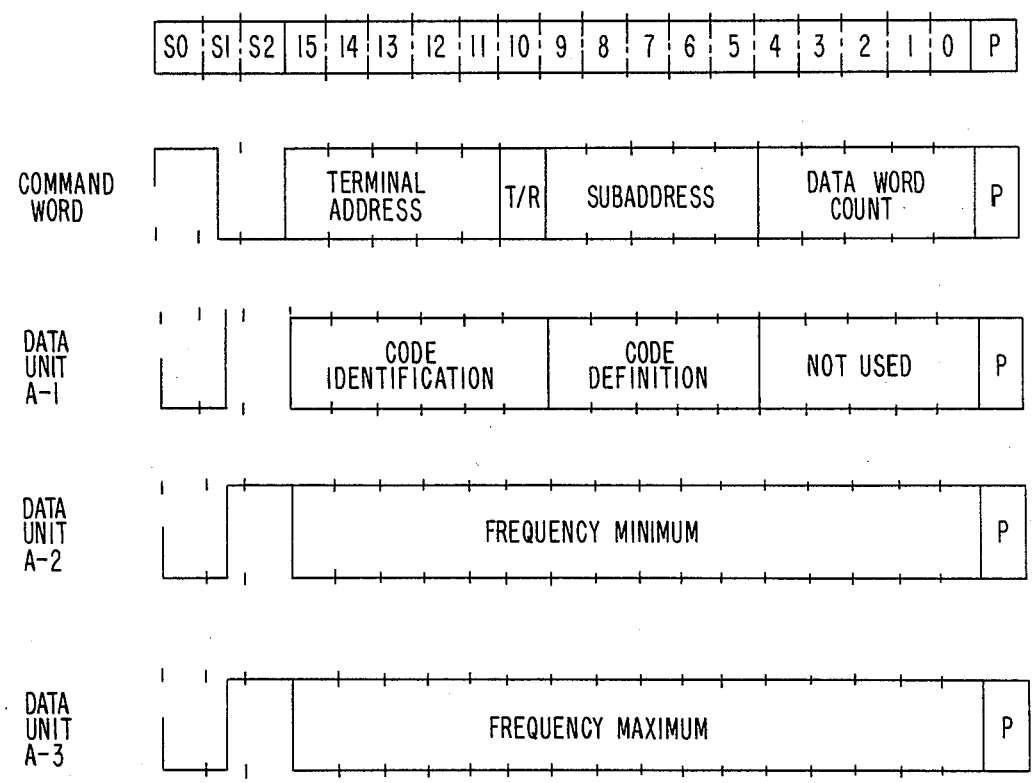
FIG. 7 depicts a series of data words which are employed by this system and which are indicative of a lookthrough code assignment according to system operation.

As seen from FIG. 7, there are command words which indicate a terminal address, a subaddress and a data word count. There are also data words which identify a code, the definition of the code as well as a data unit to identify a minimum frequency and a data unit to identify a maximum frequency. The ASPJ via its processor utilizes look-through code assignment as shown in FIG. 7 to generate a threat response matrix which is indicated in FIG. 2 by reference numeral 41. The threat response matrix data format is for example shown in detail in FIG. 4.

Figure 4:
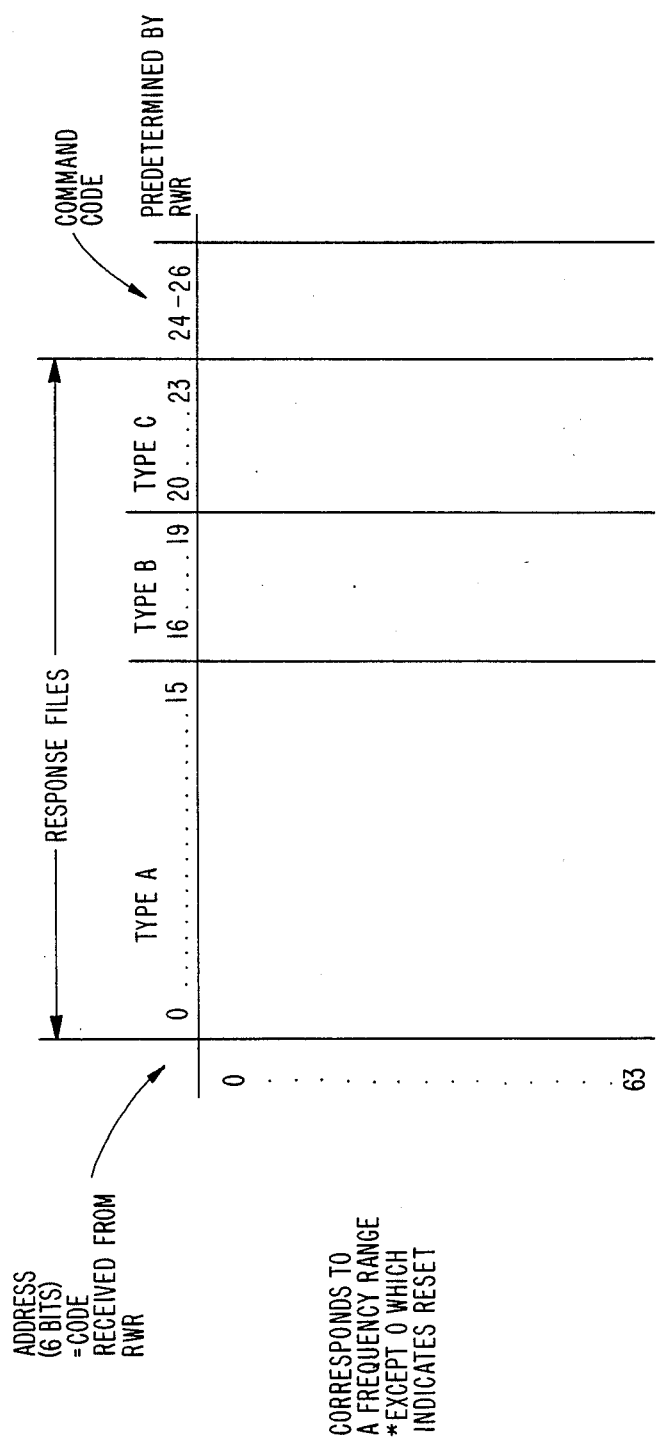
FIG. 4 is a schematic representation of the data employed in a threat response matrix according to this invention and as shown in FIG. 3.

As can be seen from FIG. 4, for each code the system supervisory control which essentially is the processor associated with the ASPJ determines the current responses occurring in the frequency range indicated in the message received for that code over the EW MUX bus. These responses are identified by files and can be of type A (bits 0–15), type B (bits 16–19) or type C (bits 20–23). The response files also contain a command code designated by bits 24 to 26 which command code is predetermined by the requirements of the RWR. As seen in FIG. 4, the address bits which are 6 bits are equivalent to a code which is received by the ASPJ from the RWR. The command control which is stored in the matrix 41 also indicates the kind of action to be taken by the ASPJ via the command code which is bits 24–26. Hence, when the code is received, one can determine five possible commands.

These commands are defined via bits 5-9 of the data unit A1 of the look-through code message which is shown in FIG. 7. This message is received on the EW MUX bus. Based on these commands, the jamming response is blanked or partially blanked and the appropriate tags as the CP or RP tags are generated as indicated in the code definition.

As seen from FIG. 3, the threat response matrix data (FIG. 4) is stored in the threat response matrix 41 end is received from the supervisory control processor via a control bus 50. The control bus 50 is a high speed bus operating at a 4 MHZ rate and is coupled to a buffer 44 for storage in the buffer of the control data. The buffer 44 is coupled to data inputs of the threat response matrix 41. Thus, the threat response matrix contains that data shown in FIG. 4 which is received via the control bus 50 and is stored in a 64×27 bit memory block or matrix 41.

The address of this memory is the code (0–63) which code appears on the LT/B bus and which for example is shown in detail in FIG. 4. The data is the response file—namely, bits 0–23 as well as the command code which are bits 24–26 as ascertained from FIG. 4. The real time response file information is received in a coded format (4 bits for type A responses, 2 bits for type B and C responses). This data is impressed upon the file decoder 43. The file decoder essentially decodes the bits emanating from the type A, type B and type C information as shown in FIG. 3 and operates to decode these files in 24 lines which are applied to a coincidence logic circuit 46. The coincidence logic circuit 46 operates to gate the file outputs with the corresponding 24 inputs from the buffer 44 which is coupled to the output of the threat response matrix 41.

Whenever a code is received over the LT/B bus, the corresponding active threat response files are accessed from the matrix 41 with the associated command code. This data is stored in buffer 44 which essentially is a 24 bit buffer. The 3 bit command code which is a test code is coupled to a coincidence logic circuit 47 which has a further input coupled to the output of coincidence logic circuit 46. The coincidence logic circuit 47 receives real time inputs from the coincidence logic circuit 46. When a true condition exists between any of the 24 file lines received from the file decoder 43 and buffer 44, the coincidence logic circuit 47 generates four outputs which consist of enables for blanking, partial blanking, RP tags or CP tags. These outputs are designated in FIG. 3.

The outputs as indicated emanate from the coincidence logic circuit 47. The circuit 47 is also connected to a priority indicator module 48 which receives information from the control bus from the ASPJ processor. The priority indicator 48 will determine whether or not the coincidence logic 47 will operate in regard to a particular radar threat. Based on the generation of the output signals from coincidence logic circuit 47 and on the command codes, the coincidence logic circuit 47 as indicated generates the four outputs. These outputs are applied to pulse-up waveforms in the transmitter control circuitry of the ASPJ for generation of tags and for blanking and as well to amplitude modulation circuitry to implement partial blanking. The enables are generated within 300 nano seconds from the leading edge of the LT/B bus probe, as will be further explained.

Thus, the look-through interface apparatus allows an existing ASPJ to operate with different RWR receiver devices without the need for system hardware or software reconfiguration. As indicated, there are two basic RWR systems and they will be described briefly. It is explained that some of the processing and some of the specific data which is exchanged between the ASPJ and the two different RWR systems differs as follows. A first RWR system which is a well known system performs environmental analysis by collecting threat data over frequency intervals which correspond to each of its RF sub-bands. During this process, the RWR requires blanking of the ASPJ. In order to minimize the disruption of jamming outputs, data gathering is performed separately for threats handled in ASPJ tracker channels provided the ECM transmission is at a low duty cycle as opposed to all other threats in the environment.

For the track threats presort flags (CP tags) are provided to allow the RWR to rapidly identify these signals. The track/non-track indication of the jamming response is made available to the RWR via the jamming assignment messages which are provided by the ASPJ over the EW MUX bus. These messages as indicated are defined in FIG. 8.

Figure 8:
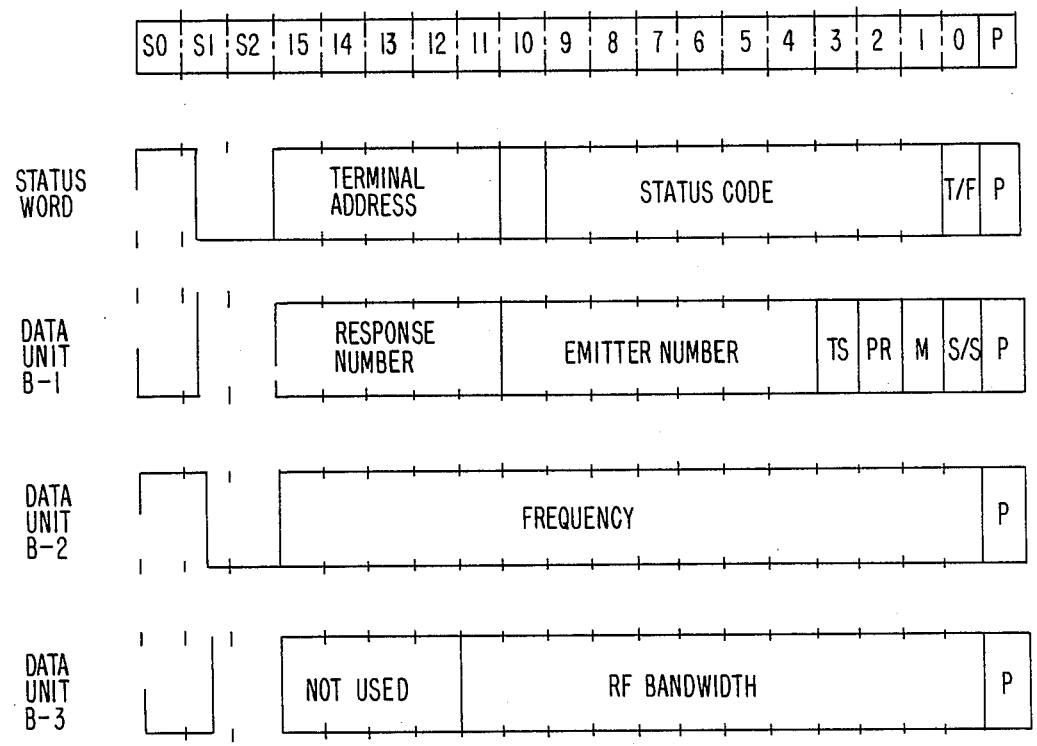
FIG. 8 is a series of data words which are employed with this system defining a jamming assignment message description.

As one can see from FIG. 8, the data in bits 4-10 of data unit B-1 indicates emitter number, and bit 3 indicates whether the response applied against this emitter is from a track channel or not. It is also noted that the data that applies to an additional RWR would be "don't care" data for operation with the above-noted RWR. The emitter number is established in the threat hand-off messages exchanged between the RWR and the ASPJ. The RWR formulates the look-through assignment messages which define frequency intervals corresponding to its sub-band frequency break points.

Based on the information received in the jamming assignment messages, the RWR sets up codes over the LT/B bus that causes blanking of all jamming responses except low-duty cycle track responses. In this case analysis of all threats receiving non-track responses or high-duty cycle track responses is performed in the RWR. The ASPJ provides the RP tags for blanking ECM from the low duty cycle responses being transmitted. When threat analysis is to be performed for signals receiving low duty cycle track responses then all responses are blanked in a specific sub-band, and CP tags are provided from the ASPJ as presort flags. The CP tags are derived from detected video corresponding to the low duty cycle track responses.

Figure 5:
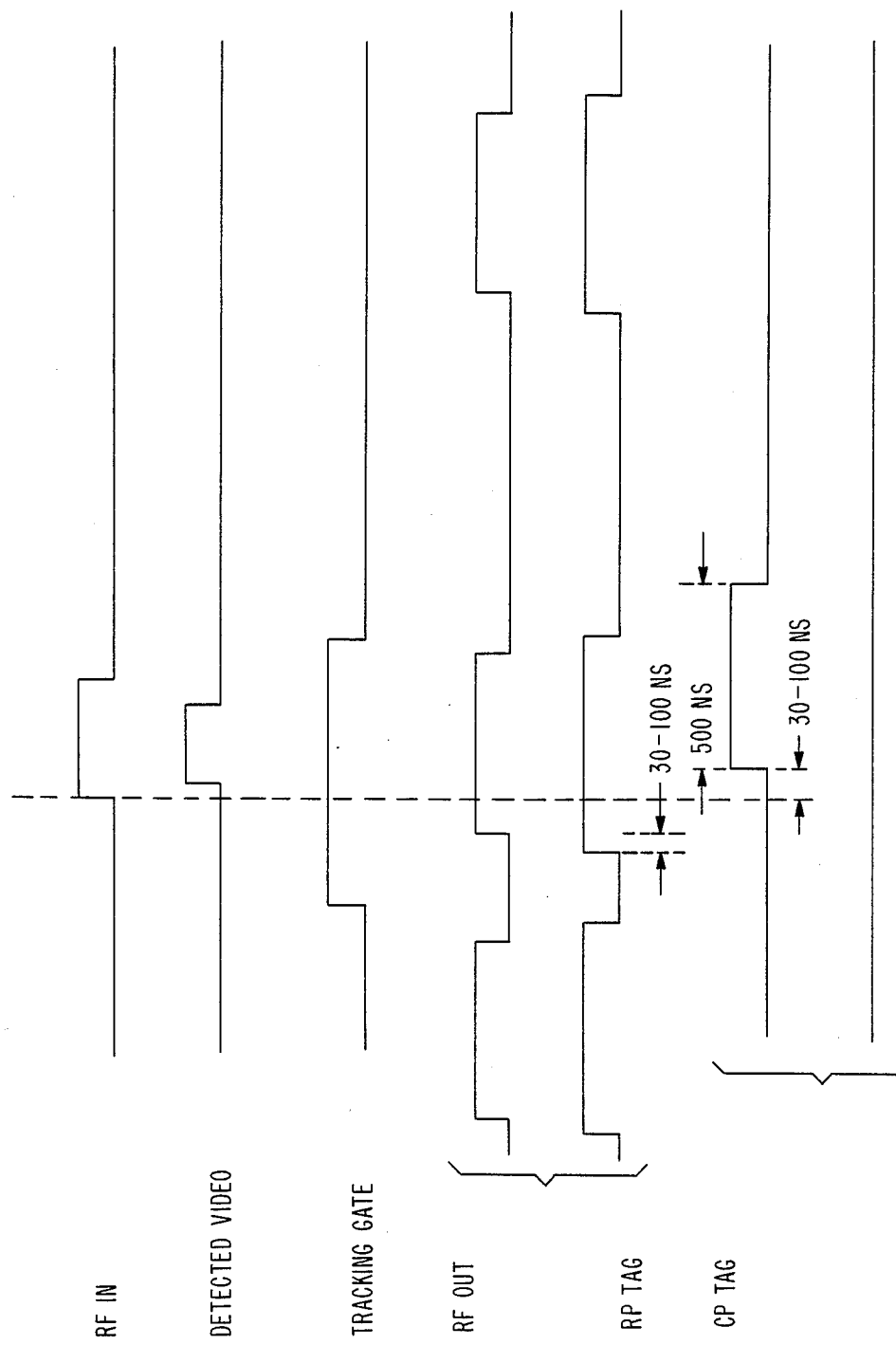
FIG. 5 is a series of waveforms indicating the various pulses which are provided by this system during a transponder mode of operation.
Figure 6:
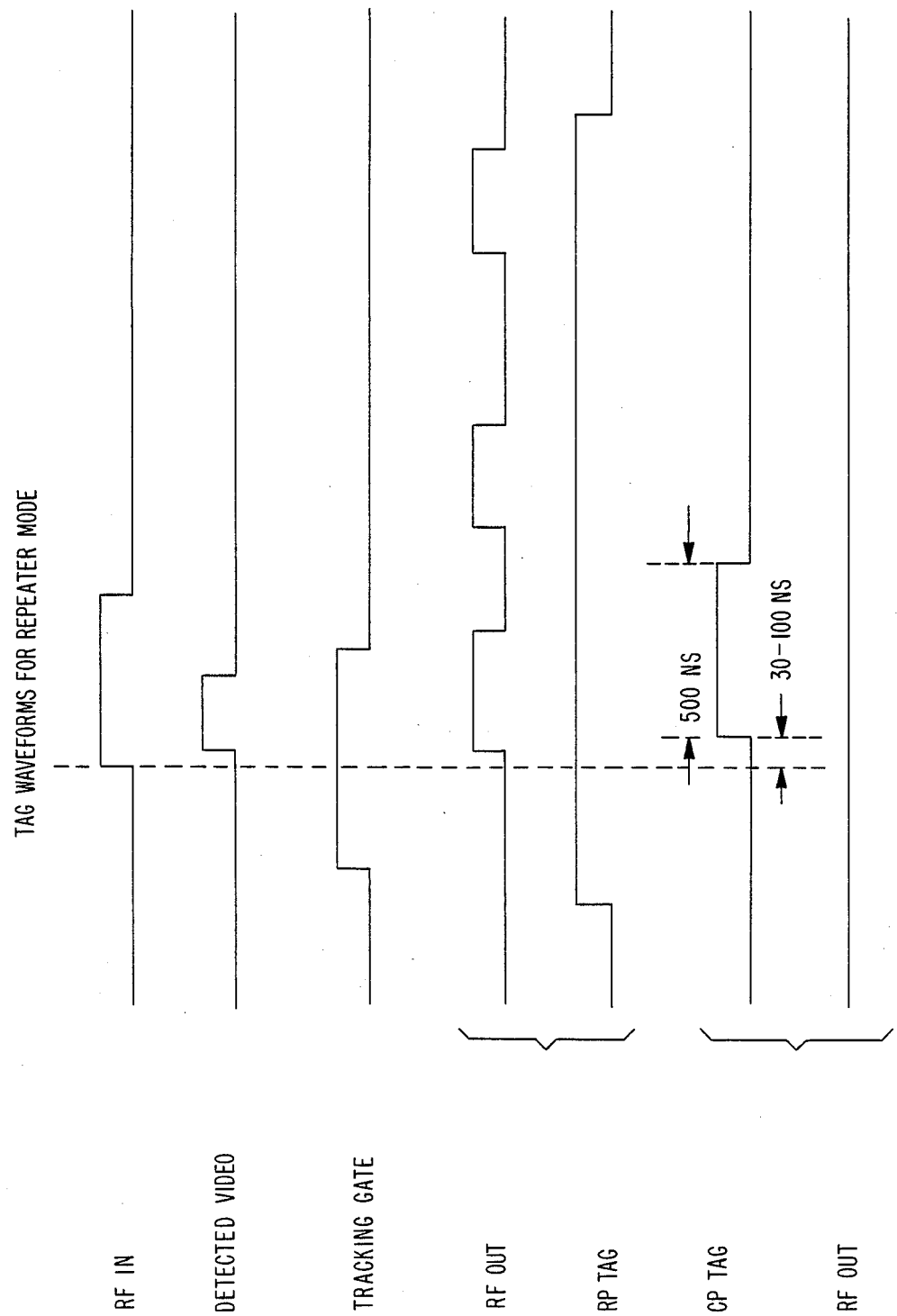
FIG. 6 is a series of timing diagrams indicative of system operation for providing various waveforms during a repeater mode.

Essentially, from the above, the exact timing of both CP and RP tags with respect to the receive inputs and ECM outputs are shown in FIGS. 5 and 6.

Referring to FIG. 5, there is shown the tag waveforms for the transponder mode.

FIG. 6 shows the tag waveforms for the repeater mode. As can be seen from FIGS. 5 and 6, the exact location of the RF input signal is depicted. Following this signal is the detected video signal. The tracking gate is generated which is associated with the RF output signals as shown in FIG. 5. The RP tag and CP tag signals are shown in conjunction with the above-noted signals. It is then seen that the RP tag and the CP tag will enable appropriate blanking and control of the RF output in the transponder mode as indicated in FIG. 5. Essentially, the signal designated as RF IN is a received threat radar signal. This signal is processed and detected and a tracking gate is generated which is a predicted signal. The ASPJ generates the RF output signal for jamming which signal is defined by one RP and CP tags to enable blanking of the RWR during transmission from the ASPJ.

FIG. 6 shows the tag waveforms for the repeater mode whereby the RF in, the detected video, the tracking gate, the RF out as well as the RP and CP tags are shown in conjunction with the RF output for the repeater mode. Thus, as one can ascertain and as further indicated in conjunction with FIG. 2, those waveforms can be controlled accordingly based on the diagrams depicted in FIGS. 5 and 6 for an RWR of a particular type. In any event, a second RWR performs its threat data gathering over any arbitrary frequency intervals depending upon threat activity. Also, except for certain measurements all other processing for threat identification in the second type of RWR can be performed even in the presence of pulse jamming provided flags are provided to indicate the occurrence of these jamming pulses.

This capability allows a reduction of look-through blanking for those responses identified as priority responses for which the percent of ECM pulses blanked must be kept to an absolute minimum. Based on such operation, the look-through operation between the ASPJ and the second RWR function as follows. The second RWR provides the look-through code assignment messages similar to the first RWR except that the look-through frequency bands are arbitrary depending on threat activity intervals and are not restricted to the RWR sub-bands.

Also in the look-through code assignment messages as for example shown in FIG. 7, bits 7 through 9 of the unit A-1 apply. Thus, codes which are transmitted over the LT/B bus allow the capability for all blanking of all responses except priority responses for which RP tags will be available as flags. These priority responses are designated by the priority indicator module 48 which is coupled to the coincidence logic 47 as shown in FIG. 3. These flags indicate to the first RWR jamming interference which requires special processing to filter out. When these priority threats also need to be blanked to allow the second RWR to obtain jam-free data samples or data updates, a different blanking code is selected which blanks all responses and provides at the same time the CP tags as flags for the priority responses.

The same definition of the RP and CP tags shown in FIGS. 5 and 6 are valid for all RWR's. Priority definition U for the responses is included in the jamming assignment message description which is shown in FIG. 8. It is noted that whenever power dropouts occur, the data exchange between the ASPJ and RWR has to be reestablished. For this purpose a retransmit request message is generated. This message is shown in detail in FIG. 9.

Referring to FIG. 7, there is shown the various command and data unit words for the look-through code assignment message description. As seen in FIG. 7, the command word consists of bits 11–15. These bits serve to provide the terminal address which essentially is the address or code for the ASPJ unit. Bit 10 is designated as a T/R bit which is transmit or receive bit whereby the receive condition will be indicative of a binary zero and the transmit condition indicative of binary one or vice versa.

Bits 5–9 indicate a subaddress which basically is a 11101. Bits 0–4 specify a data word count. This data word count represents a number of LT codes in the message which can thereby provide a number of different codes. The number will be equivalent to 10 LT codes in this message. There may be further codes in the next message. The letter P in all instances designates the parity bit which is an odd parity. In regard to the data units, for example the A-1 data, it utilizes bits 10–15 as a code identification. Essentially, the binary value zero is equivalent to a predefined reset code while binary value 1 to 63 designates various code numbers as for example indicated in conjunction with FIG. 4 each of which corresponds to a frequency range as specified with the understanding of course that binary zero indicates a reset condition.

Bits 5–9 in the data unit mode defines a code definition. For example, bit 5 may be set 1. If bit 5 is set to 1, the unit will understand that it is to blank non-tracked and high duty tracked responses thus indicating to the apparatus to generate RP tags for low-duty tracked responses.

Bit 6 set to 1 corresponds to the blanking of all responses and one would generate RP tags for low-duty track responses. Bit 7 set to 1 indicates the blanking of all responses except priority responses. Thus, the system would generate an RP tag for priority responses. Bit 8 set to 1 would indicate the blanking of all responses and the generation of a CP tag for priority responses. Bit 9 set to 1 would indicate the partial blanking of all responses. It is noted that bits 0–4 are not used in the data unit A=1 mode.

It is also noted that bits 5 and 6 would apply to only one particular RWR as RWR 1. Bits 7 to 9 apply to the second RWR device as RWR−2.

As one will also ascertain from FIG. 7, data bits in regard to the data unit A-2 modes are as follows. Bits zero to 15 function to determine a minimum frequency which is the lower limit of frequency range affected by the code. This creates a resolution of approximately 1 MHZ or thereabouts. Data bits indicative of data unit A-3 where one utilizes bits zero to 15 function to determine a frequency maximum which essentially is the upper limit of frequency range affected by the codes with the same resolution as above indicated. In regard to the jamming assignment message description shown in FIG. 8, the following is pertinent. When transmitting a status word, bits 11–15 again define the terminal address which is the address of the ASPJ. Bit 14 is a message error bit. The bit is a zero if no error is received in the RWR sent data words and the bit is a 1 if there is a error received in the RWR sent data words. Bits 1–9 determine the status code field and are not assigned. Bit zero is a terminal flag bit. A zero means that no immediate response is required by the equipment while a 1 indicates that such a response is required. P again stands for the parity bit.

In regard to the data unit or the B-1 bits, bits 11 to 15 indicate a response number which essentially is the ASPJ assigned reference. Bits 4–10 are the emitter numbers which is an RWR assigned reference. This may be for example assigned by the RWR 1. Bit 3 is the track status where a 1 indicates a tracking mode and a zero a non-tracking mode. Bit 2 is the priority bit whereby a binary 1 indicates high priority and a binary zero indicates low priority. Bit 1 is a mode bit whereby a binary 1 indicates a repeater operation and binary zero a transponder operation. Bit zero is a jamming start/stop where a 1 means stop a jamming mode and a zero indicates to start the jamming mode. It is noted that bits 4–10 and bit 3 apply to the RWR of type 1 while bits 11–15 and bit 2 applies to the RWR of type 2.

Referring again to FIG. 8, there is indicated a data unit B-2 word. The bits zero to 15 function to define the frequency whereby the center frequency of the threat is calculated according to a given resolution. The data unit word designated as B-3 bits shows bits 12–15 which are not used. Bits 0–11 determine an RF bandwidth which is a response bandwidth while P again stands for the parity and as indicated odd parity may be employed in this system.

Figure 9:
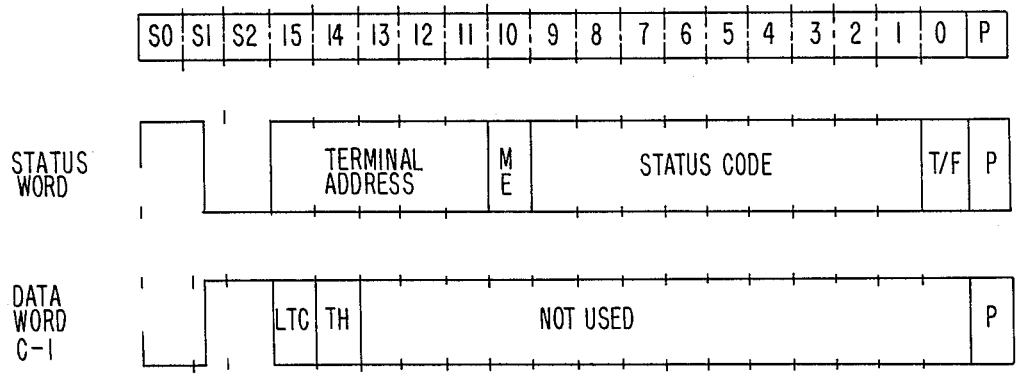
FIG. 9 is a series of data words employed in this system indicative of a retransmit request message format description.

In regard to FIG. 9, there is shown the retransmit request message format. As one can ascertain from FIG. 9, the status word is identical with the status word employed for example in regard to FIG. 8. The data word which is the C-1 word utilizes bit 15 as a look-through code transmit whereby a binary 1 is equivalent to the retransmission of the LT message. Bit 14 is a threat hand off retransmit whereby a binary 1 is equal to the restart threat hand off. Bits 0–13 are not used and bit P again is a parity bit.

It thus can be ascertained from the above noted Figures and description of the data words and with the entire specification the look-through blanking bus interface or the interface 30 is clearly ascertained. All logic which is depicted for example in FIG. 3 such as the coincidence logic modules 46 and 47 perform in accordance with the above-described data format and enable the interchange of signals as indicated for example in FIGS. 5 and 6. Thus, full control of the jammer is implemented by any RWR whether the system is operating in a transponder mode as shown in FIG. 5 or in a repeater mode as shown in FIG. 6. In this manner one has the ability to selectively blank according to the requirements of the RWR whether the RWR is a type 1 or type 2 device. This system automatically based on the loading of the threat response matrix from the LT/B bus can respond to such data by analyzing the data in real time and generating the proper blanking signals as well as the tag signals by the analysis of such data.

We claim:

1. In an electronic countermeasures (ECM) system of the type employing a jamming apparatus including a transmitter portion for transmitting jamming signals in order to deceive a foreign transmitter/receiving apparatus and including a warning receiver means operative to receive foreign or threat transmissions to determine the nature of such transmissions and to inform said jamming apparatus of the nature of such threat transmissions, with said warning receiver means capable of operating according to different modes in order to determine the nature of said foreign transmissions, the combination therewith of apparatus for providing selective blanking to said jamming apparatus according to the modes of operation of said receiver means to allow said receiver means and said jamming means to operate without interference between the same, comprising:

interface means coupled between said jamming apparatus and said receiver means and adapted to exchange information between said jamming apparatus and said receiver means to generate optimum blanking parameter information between said jamming apparatus and said receiver means according to the mode of operation of said receiver means whereby any one of said modes can be accommodated by said ECM system according to said information exchanged, said interface means including a first data bus coupled between said jamming apparatus and said receiver means and adapted to propagate a series of command codes determined according to the mode of operation of said receiver means and indicative of said information exchange according to said series of command codes, a second data bus coupled between said jamming apparatus and said receiver means and adapted to propagate code assignment messages defining a frequency range of operation to said receiver means to determine said blanking parameter information according to one of said command codes on said first bus indicative of said information exchange according to said code assignment messages.

2. The ECM system according to claim 1, wherein said jamming apparatus is an aircraft self-protection jammer (ASPJ) with said warning receiver means being a radar warning receiver of the type employed in an aircraft ECM system.

3. The ECM system according to claim 1 wherein said first data bus consists of six data lines and a strobe line wherein data is encoded to provide 64 individual command codes.

4. The ECM system according to claim 1, wherein said interface means includes, a threat response storage means having stored at a plurality of memory locations information indicative of a matrix of data defining a plurality of system response files according to the mode of operation of said receiver means, with inputs means of said threat response matrix coupled to said first data bus for supplying an address code thereto for accessing any one of said stored files, file decoder means coupled to said second data bus and operative to decode said code assignment messages on a real time basis for generating at an output decoded data indicative of one of said given stored files, comparator means coupled to said threat response storage means and said file decoder means for comparing said stored data at an address according to said data on said first data bus with said file decoder means output to determine a comparison between said compared data indicative of a given receiver mode and means for generating said optimum blanking parameter information according to said comparison.

5. The ECM system according to claim 4, wherein said blanking parameter information includes a blanking pulse, a partial blanking pulse, a cover pulse tag and a repeater pulse tag.

6. The ECM system according to claim 1, wherein said receiver means operates in a first mode by collecting threat transmissions over frequency intervals corresponding to received RF sub-bands.

7. The ECM system according to claim 1, wherein said receiver means operates in a second mode by collecting threat transmissions over arbitrary frequency intervals not restricted to received RF sub-bands.

8. The ECM system according to claim 4, wherein said threat response storage means is a 64×27 memory block.

9. The ECM system according to claim 6, further including means operative in said first mode and coupled to said first bus and responsive to said data indicative of lowduty cycle tracked responses.

10. The ECM system according to claim 4, further including priority means coupled to said comparator means and operative to provide blanking to said jamming apparatus on a priority basis whereby high priority threats are indicative o a different blanking format.

11. The ECM system according to claim 4, further including a first buffer means coupled to said first data bus and operative to store data on said bus indicative of a given address, with the outputs of said buffer means coupled to said input means of said storage means.

12. The ECM system according to claim 4, further including second buffer means having inputs coupled to the output of said storage means with outputs coupled to said comparator means and operative to store said data at said address in said second buffer means prior to comparing the same.

13. The ECM system according to claim 1, wherein said warning receiver means is a radar warning receiver having an antenna array for receiving threat transmissions in each of four quadrants, analyzing means coupled to said array for providing at an output the angle of arrival of received threat signals and for analyzing said threat signals according to characteristics of said received signals to determine a foreign signal from a friendly signal.

14. The ECM system according to claim 1, wherein said receiver modes of operation are implemented by a first receiver operative in a first mode and second receiver operative in a second mode.

15. The ECM system according to claim 4, wherein said jamming apparatus includes a processor means for processing signals from said receiver means to analyze said signals as processed for generating data to be stored in said storage means.

16. The ECM system according to claim 15, wherein said jamming apparatus further includes receiving means for receiving foreign or threat transmissions and for applying said received signals to said processor means for performing signal analysis of said signals as further implemented by said exchanged information from said receiver means.

17. The ECM system according to claim 13, wherein said antenna array comprises four antenna elements each adapted to monitor a 90° space quadrant 18. The ECM system according to claim 4, wherein said file decoder means provides 24 different output codes.

* * * * *